(12) United States Patent
Ueda et al.

(10) Patent No.: US 8,022,799 B2
(45) Date of Patent: Sep. 20, 2011

(54) THIN MULTI-FUNCTION VIBRATION ACTUATOR

(75) Inventors: Minoru Ueda, Tokyo (JP); Shoichi Kaneda, Tokyo (JP); Kenji Ueno, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 270 days.

(21) Appl. No.: 12/097,184

(22) PCT Filed: Dec. 13, 2006

(86) PCT No.: PCT/JP2006/324795
§ 371 (c)(1),
(2), (4) Date: Dec. 15, 2008

(87) PCT Pub. No.: WO2007/069619
PCT Pub. Date: Jun. 21, 2007

(65) Prior Publication Data
US 2009/0278644 A1  Nov. 12, 2009

(30) Foreign Application Priority Data
Dec. 13, 2005  (JP) ................ 2005-359507

(51) Int. Cl.
*H01F 7/08* (2006.01)
(52) U.S. Cl. ....... 335/222; 340/7.6; 340/388.1; 381/396
(58) Field of Classification Search ......... 335/222, 335/223, 302–306; 340/7.6, 388.1–388.8; 381/401–402, 396
See application file for complete search history.

(56) References Cited

U.S. PATENT DOCUMENTS

| | | | | |
|---|---|---|---|---|
| 6,539,097 B2* | 3/2003 | Sakai | ............... | 381/413 |
| 6,590,991 B1* | 7/2003 | Maeda | ............. | 381/409 |
| 6,608,541 B2* | 8/2003 | Shiraki et al. | ................. | 335/222 |
| 6,611,605 B2* | 8/2003 | Kim | ................ | 381/406 |
| 6,847,139 B2* | 1/2005 | Ueda et al. | ..................... | 310/81 |
| 6,850,138 B1* | 2/2005 | Sakai | ............. | 335/222 |
| 7,224,090 B2* | 5/2007 | Oh et al. | ........................ | 310/14 |
| 7,358,633 B2* | 4/2008 | Kweon et al. | ................... | 310/81 |
| 7,671,493 B2* | 3/2010 | Takashima et al. | ............. | 310/15 |

FOREIGN PATENT DOCUMENTS

| | | |
|---|---|---|
| JP | 10117472 | 5/1998 |
| JP | 2004266384 | 9/2004 |
| WO | 9939843 | 12/1999 |

OTHER PUBLICATIONS

International Search Report for PCT/JP2006/324795 mailed on Jan. 16, 2007.

* cited by examiner

*Primary Examiner* — Lincoln Donovan
*Assistant Examiner* — Bernard Rojas
(74) *Attorney, Agent, or Firm* — Studebaker & Brackett PC; Donald R. Studebaker

(57) ABSTRACT

A magnetic circuit unit includes a pole piece, a magnet, and a yoke and a suspension made of a magnetic material. A magnetic gap is formed between an inner circumferential side surface of the suspension and a circumference of the pole piece. Accordingly, it is possible to allow the magnet in the magnetic circuit unit to be thinly constructed. In addition, it is possible to implement a multi-function vibration actuator having a thin structure and capable of obtaining a sufficiently sensible vibration.

6 Claims, 1 Drawing Sheet

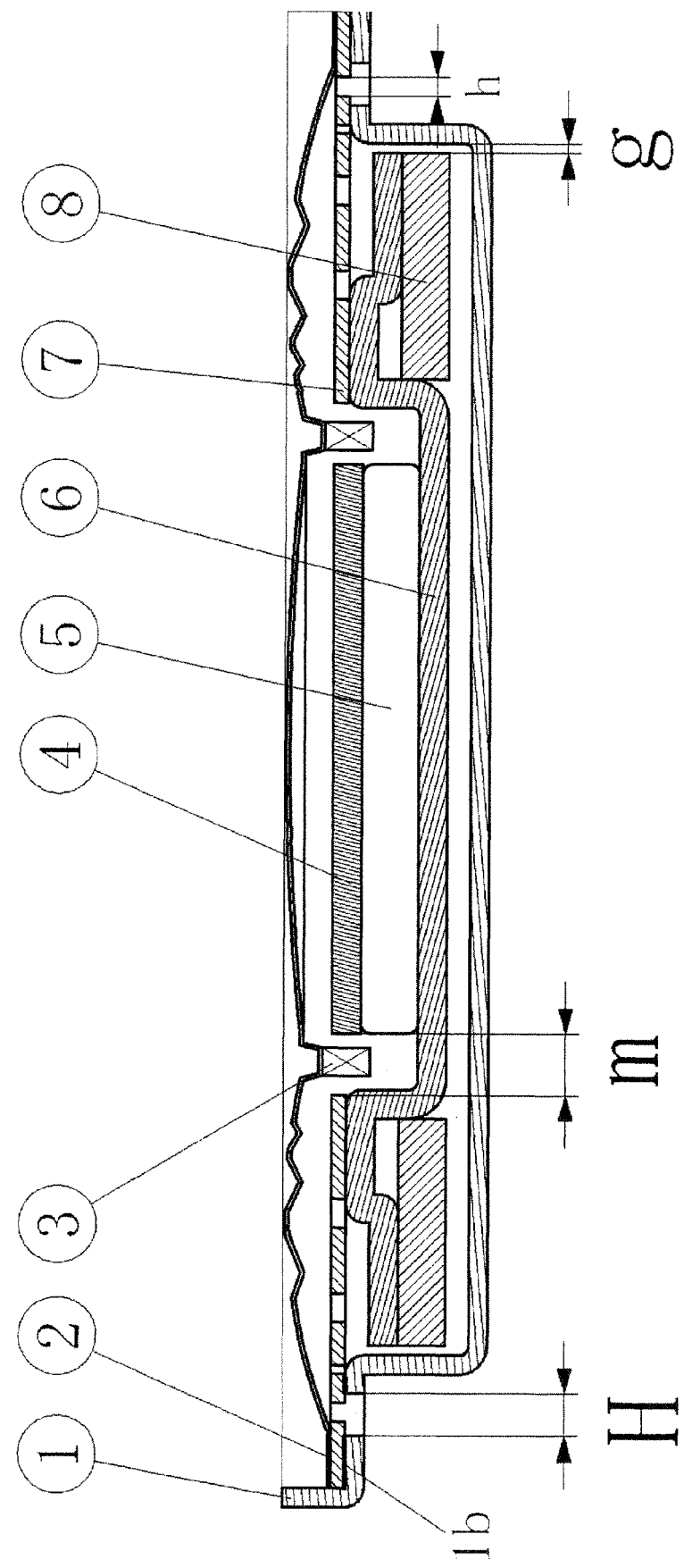

THIN MULTI-FUNCTION VIBRATION ACTUATOR

TECHNICAL FIELD

The present invention relates to a multi-function vibration actuator having a vibration generating function and a sound releasing function in one body, built in a mobile phone or a miniaturized portable electronic apparatus.

RELATED ART

Recently, in general, a portable electronic apparatus such as a mobile phone has a "manner-mode" function of generating a sensible vibration as well as a sound releasing function of releasing a voice, an alarm sound, or the like. The sound and the vibration are separately output through an electric-acoustic converter and a vibration generator built in the portable electronic apparatus.

Among such electric-acoustic converters, there is an electric-acoustic converter using a dynamic structure. A representative electric-acoustic converter is disclosed in Japanese Patent Application Laid-Open No. 10-145891 (hereinafter, referred to as Patent Document 1).

In Patent Document 1, a diaphragm is vibrated by applying an input signal to a coil provided to the diaphragm. A magnetic circuit unit having a magnet magnetized in a plate-thickness direction and a pole piece made of a magnetic material is provided in a housing having a dish-shaped cross section, and the coil is moved by a mutual magnetic force exerted between the magnetic circuit unit and the coil, so that the diaphragm is vibrated.

In Patent Document 1, a terminal plate is disposed in an outer side of a yoke, so that it is possible to obtain a structure that is thinner than a conventional miniaturized dynamic speaker and to easily perform wiring thereof.

In addition, a damper made of a non-woven fabric is attached to air-vent holes, so that it is possible to obtain effects of limiting an air flow inside and outside a case and suppressing an infinitesimal vibration of the diaphragm.

In addition, since the damper is interposed and attached between the housing (referred to as a frame in Patent Document 1) and the terminal plate, the damper is interposed between the terminal plate and the housing, so that it is possible to obtain a uniform characteristic with respect to a plurality of the air-vent holes.

In addition, in some embodiments disclosed in Patent Document 1, the terminal plate is provided with a terminal protruding from the frame, so that it is possible to obtain a structure where position alignment can be easily performed at the time of attaching a board.

However, in terms of the structure of the electric-acoustic converter disclosed in Patent Document 1, there is no function of generating vibration. Therefore, there is a problem in that a separate vibration generator needs to be provided.

In order to solve the problem, a multi-function vibration actuator having both functions of releasing sound and generating vibration in one body is disclosed in Japanese Patent Application Laid-Open No. 2002-239459 (hereinafter, referred to as Patent Document 2).

In Patent Document 2, a magnetic circuit unit having a yoke, a magnet, and a pole piece is supported toward an inner wall of the housing by a suspension. A diaphragm provided with a coil is vibrated at the time of generating sound, and the magnetic circuit unit is vibrated at the time of generating vibration.

In Patent Document 2, a combinational structure of one pair is used, so that, with respect to the input signal input to the coil at the time of generating sound and the input signal input to the coil at the time of generating vibration, a control method using separate resonance frequencies of the input signals input to the same coil can be implemented For this reason, in Patent Document 2, both of the vibration and the sound can be output, and the sound reproduction and the vibration generation can be performed simultaneously by using the separate input frequencies for the vibration generation and sound reproduction.

In addition, in Patent Document 2, a coil is wound around a bobbin and fixed to a diaphragm so as to easily dispose the coil at a position where it can be driven at a high magnetic efficiency at the time of driving thereof. Therefore, it is possible to dispose the coil at the position where assembling in production can be easily performed and it can be driven at a high magnetic efficiency.

In addition, on the diaphragm, the position where the coil is fixed has a concave structure, so that it is possible to easily perform the position alignment of the coil at the time of assembling and to prevent the coil from being separated from the diaphragm at the time of being impacted due to falling.

In addition, since the yoke can be operated as a weight member at the time of vibration, there is no need to provide a separate weight member, so that it is possible to easily perform assembling in production and to reduce production cost.

In addition to the aforementioned advantages, according to some embodiments of Patent Document 2, a slanted portion is provided to the yoke to form a suspension recessing portion for the time of driving thereof, so that it is possible to suppress an increase in thickness of a whole apparatus.

Due to the aforementioned advantages, in Patent Document 2, it is possible to implement a multi-function vibration actuator capable of being driven at a high magnetic efficiency and preventing the coil from being separated at the time of being impacted due to falling.

DISCLOSURE OF THE INVENTION

Problems to be Solved by the Invention

Recently, as portable apparatuses where a multi-function vibration actuator is built become smaller and smaller, a thinner multi-function vibration actuator than the multi-function vibration actuators disclosed in Patent Documents is demanded. However, the conventional multi-function vibration actuators have a problem in that it is difficult to implement thinner multi-function vibration actuators due to structures thereof.

The electric-acoustic converter disclosed in Patent Document 1 can be implemented as a thin and miniaturized one. However, a space for attaching a vibration generator separately provided needs to be ensured. As a result, a larger attaching area than an attaching area of the multi-function vibration actuator representatively exemplified in Patent Document 2 is needed, so that it is difficult to miniaturize a portable electric apparatus where the multi-function vibration actuator is built.

In the multi-function vibration actuator disclosed in Patent Document 2, since the yoke is used as a weight member, when the multi-function vibration actuator is formed as a thin one, a vibration amplitude is decreased, so that it is difficult to obtain a sufficient vibration amplitude.

In order to solve the aforementioned problems, an object of the present invention is to provide a multi-function vibration actuator capable of being easily formed as a thin shape with a simple structure and obtaining a sufficient vibration amplitude.

Means for Solving the Problems

In order to solve the problems, there is provided a multi-function vibration actuator comprising: a magnetic circuit unit having a plate-shaped magnet magnetized in a thickness direction, a pole piece made of a plate-shaped magnetic material and attached on the one surface of the magnet, and a yoke made of a magnetic material and attached on the other surface of the magnet so as to form a magnetic gap between an end of the pole piece and the yoke; a housing accommodating the magnetic circuit unit; a suspension supporting the magnetic circuit unit toward an inner wall of the housing; and a coil attached to a diaphragm and disposed in the magnetic gap, the magnetic circuit unit or the diaphragm being vibrated by applying an alternating current to the coil attached to the diaphragm, wherein the suspension is made of a magnetic material, and wherein the suspension is disposed on an circumferential portion of the magnetic circuit unit so that an end portion of an inner circumferential side surface of the suspension constitutes one end of the magnetic gap.

Further, according to the invention, there is provided a multi-function vibration actuator comprising: a magnetic circuit unit having a plate-shaped magnet magnetized in a thickness direction, a pole piece made of a plate-shaped magnetic material and attached on the one surface of the magnet, and a yoke made of a magnetic material and attached on the other surface of the magnet so as to form a magnetic gap between an end of the pole piece and the yoke; a housing accommodating the magnetic circuit unit; a suspension supporting the magnetic circuit unit toward an inner wall of the housing; and a coil attached to a diaphragm and disposed in the magnetic gap, the magnetic circuit unit or the diaphragm being vibrated by applying an alternating current to the coil attached to the diaphragm, wherein the suspension is made of a magnetic material, wherein the suspension is disposed on an circumferential portion of the magnetic circuit unit so that an end portion of an inner circumferential side surface of the suspension constitutes one end of the magnetic gap, wherein a stepped portion is provided in an inner circumferential portion of the housing so that an outer circumferential surface of the suspension is supported by the stepped portion, and wherein sound releasing holes are provided to penetrate through the stepped portion and the suspension.

Still further, according to the invention, a weight member is attached to the magnetic circuit unit.

Also, according to the invention, a gap between a side surface of the magnetic circuit unit and an inner wall of the housing having a cylindrical shape is in a range of 0 to 2.5% of an inner-wall radius of the housing.

Effects

According to the inventor, when the multi-function vibration actuator is formed as a thin one, an inner side end portion of the suspension is used as the one end of the magnetic gap, so that it is possible to maintain a magnetic efficiency, to suppress power consumption down to a lower level, and to obtain good vibration characteristics.

In the multi-function vibration actuator according to the invention, the suspension is made of a magnetic material, and the inner circumferential side wall thereof is used for the magnetic gap, so that it is possible to simplify a shape of the yoke. For this reason, a thinner yoke can be formed, so that it is possible to ensure a driving space for the magnetic circuit unit driven inside the housing at the time of vibration generation.

Also according to the invention, the outer circumferential portion of the suspension is fixed on the stepped portion of the housing, and the sound releasing holes are formed to penetrate through the housing and the suspension, so that the suspension is added with functions as a component of the magnetic circuit unit, a supporting member, and a sound releasing hole.

Further, according to the invention the magnetic circuit unit is provided with a separate weight member, so that it is possible to maintain a vibration amplitude when the multi-function-vibration actuator is formed as a thinner one.

Additionally, according to the invention a gap between the side wall of the magnetic circuit unit and the inner wall of the housing is set to be in a range of more than 0 to equal to or less than 2.5% of the inner-wall radius of the housing, so that it is possible to limit an amount of air flow in upper and lower spaces interposing the magnetic circuit unit and to use the air in the upper and lower spaces as a damper at the time of driving thereof.

BEST MODE FOR CARRYING-OUT THE INVENTION

Hereinafter, an embodiment of the present invention will be described with reference to FIG. 1.

BRIEF DESCRIPTION OF THE DRAWING

FIG. 1 is a side cross-sectional view illustrating a multi-function vibration actuator according to a first embodiment of the present invention.

As shown in FIG. 1, the multi-function vibration actuator according to the embodiment of the present invention includes a housing 1, a suspension 7 which has a sound releasing hole h formed at a position corresponding to a sound releasing hole H penetrating through the housing 1 by attaching an outer circumferential portion to a stepped supporting surface 1b of the housing 1, a yoke 6 which is provided in an inner circumferential portion of the suspension 7, a magnet 5 which is provided at a central portion of the yoke 6 and magnetized in a vibration direction, a pole piece 4 which is attached on an upper portion of the magnet 5 to form a magnetic gap m with respect to an inner circumferential side surface of the suspension 7, a diaphragm 2 which is attached to an outer circumferential portion of the suspension 7 so as for a coil 3 attached at the central portion to be located in the magnetic gap m, and a ring-shaped weight member 8 which is attached to an lower portion of the yoke 6.

In FIG. 1, the pole piece 4, the yoke 6, and the suspension 7 are made of a magnetic material, so that a magnetic flux of the magnet 5 can be concentrated on the magnetic gap m. According to the embodiment, due to such a construction, it is possible to implement a thin multi-function vibration actuator capable of obtaining a high magnetic efficiency.

In addition, the sound releasing holes H and h are provided to penetrate through the housing 1 and the suspension 7, so that it is possible to adjust sound characteristics and to improve speaker characteristics.

In the multi-function vibration actuator according to the embodiment, the housing 1 is integrally formed, so that it is possible to reduce the number of components and to reduce production cost.

In addition, a gap g between a side surface of the magnetic circuit unit including the yoke 6, the magnet 5, the pole piece 4, and the weight member 8 supported by the suspension 7 and an inner wall of the housing 1 is set to be in a range of 0 to 2.5% of an inner-wall radius of the housing 1, so that it is possible to limit an amount of air flow in upper and lower spaces interposing the magnetic circuit unit at the time of driving the magnetic circuit unit and to obtain stable vibration characteristics. In the setting of actual dimension, an optimal value of the gap is changed according to the inner-wall radius of the housing, and as the radius is smaller and smaller, the optical value of the gap approaches 0%. However, in a case where the radius is increased, if the radius exceeds 2.5%, it is difficult to obtain a sufficient effect as an air damper.

In the embodiment, the sound releasing function can be operated by applying a voltage or current in the vicinity of a resonance frequency of the diaphragm 2 to the coil 3, and the vibration function can be operated by applying a voltage or current in the vicinity of a resonance frequency of the magnetic circuit unit to the coil. Accordingly, it is possible to use the sound reproducing function and the vibration generating function simultaneously.

In addition, since the weight member 8 is formed as a separate member in the magnetic circuit unit, it is possible to easily adjust the vibration characteristics.

As described above, according to the present invention, it is possible to implement a thin multi-function vibration actuator with a simple structure. In addition, due to a weight member attached, a decrease in a vibration amplitude can be suppressed, so that it is possible to implement a multi-function vibration actuator capable of generating a sufficient vibration amplitude.

The invention claimed is:

1. A multi-function vibration actuator comprising:
   a magnetic circuit unit having a plate-shaped magnet magnetized in a thickness direction, the plate-shape magnet includes a first surface and a second surface opposite of the first surface,
   a pole piece made of a plate-shaped magnetic material having a circumference and attached on the first surface of the magnet, and
   a yoke made of a magnetic material and attached on the second surface of the magnet,
   a magnetic gap formed between the circumference of the pole piece and the yoke, the magnetic gap having an inner end defined by the circumference of the pole piece and an outer end;
   a housing accommodating the magnetic circuit unit;
   a suspension supporting the magnetic circuit unit within an inner wall of the housing, the suspension has an inner circumference; and
   a coil attached to a diaphragm and disposed in the magnetic gap,
   the magnetic circuit unit or the diaphragm being vibrated by applying an alternating current to the coil attached to the diaphragm,
   wherein the suspension is made of a magnetic material, and
   wherein the suspension is disposed on the magnetic yoke of the magnetic circuit unit wherein the inner circumference of the suspension constitutes the outer end of the magnetic gap.

2. The multi-function vibration actuator according to claim 1, wherein a weight member is attached to the magnetic circuit unit.

3. The multi-function vibration actuator according to claim 1, wherein a gap between a side surface of the magnetic circuit unit and an inner wall of the housing having a cylindrical shape is in a range of 0 to 2.5% of an inner-wall radius of the housing.

4. A multi-function vibration actuator comprising:
   a magnetic circuit unit having a plate-shaped magnet magnetized in a thickness direction, the plate-shape magnet includes a first surface and a second surface opposite of the first surface,
   a pole piece made of a plate-shaped magnetic material having a circumference and attached on the first surface of the magnet, and
   a yoke made of a magnetic material and attached on second surface of the magnet,
   a magnetic gap formed between the circumference of the pole piece and the yoke, the magnetic gap having an inner end defined by the circumference of the pole piece and an outer end;
   a housing accommodating the magnetic circuit unit;
   a stepped portion provided in the inner circumferential portion of the housing;
   a suspension supporting the magnetic circuit unit within an inner wall of the housing, the suspension has an inner circumference and an outer circumference; and
   a coil attached to a diaphragm and disposed in the magnetic gap,
   the magnetic circuit unit or the diaphragm being vibrated by applying an alternating current to the coil attached to the diaphragm,
   wherein the suspension is made of a magnetic material,
   wherein the inner circumference of the suspension constitutes the outer end of the magnetic gap,
   wherein an outer circumferential surface of the suspension is supported by the stepped portion of the housing, and sound releasing holes provided through the stepped portion and the suspension.

5. The multi-function vibration actuator according to claim 4, wherein a weight member is attached to the magnetic circuit unit.

6. The multi-function vibration actuator according to claim 4, wherein a gap between a side surface of the magnetic circuit unit and an inner wall of the housing having a cylindrical shape is in a range of 0 to 2.5% of an inner-wall radius of the housing.

* * * * *